Oct. 1, 1968         J. MERCIER         3,404,175
PROCESS FOR FORMING AND SEPARATING ETHERS OR ESTERS BY
PLURAL STAGE DISTILLATION WITH REMOVAL
OF WATER AS AN AZEOTROPE
Filed March 4, 1965
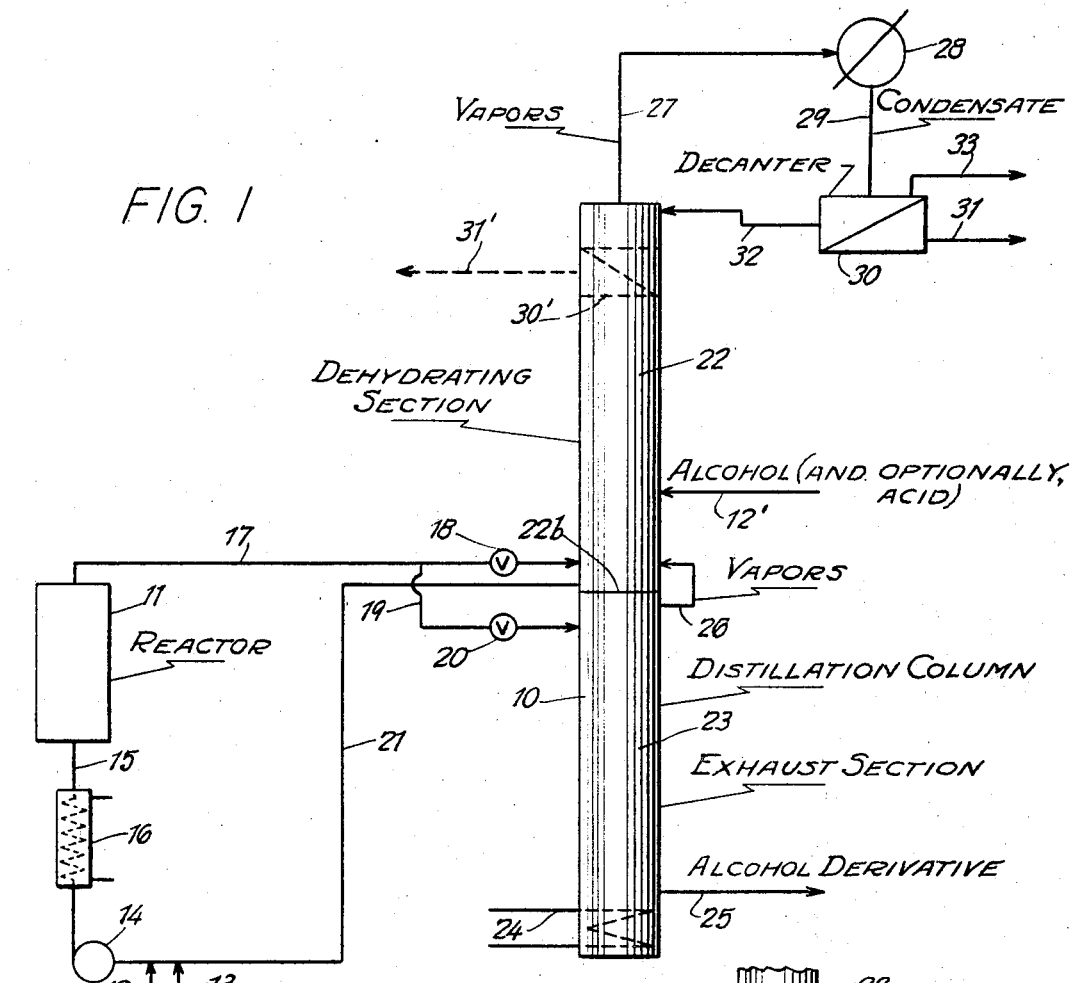
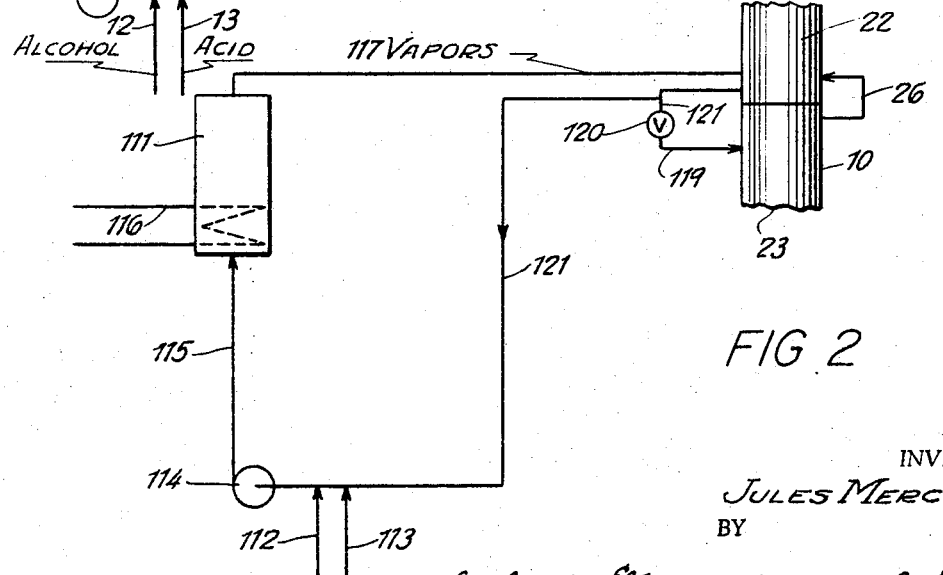
INVENTOR.
JULES MERCIER.
BY
Ward, Haselton, McLhanno, Orme, Brooks & Fitzpatrick
ATTORNEYS.

United States Patent Office 3,404,175
Patented Oct. 1, 1968

3,404,175
PROCESS FOR FORMING AND SEPARATING ETHERS OR ESTERS BY PLURAL STAGE DISTILLATION WITH REMOVAL OF WATER AS AN AZEOTROPE
Jules Mercier, Melle, Deux-Sevres, France, assignor to Les Usines de Melle (Societe Anonyme), Melle, Deux-Sevres, France, a corporation of France
Filed Mar. 4, 1965, Ser. No. 437,065
Claims priority, application France, Apr. 6, 1964, 969,896
9 Claims. (Cl. 260—488)

ABSTRACT OF THE DISCLOSURE

Process for the formation and separation of ester or ether derivatives of alcohols by distilling in a two section distillation column having an upper dehydration section and a lower exhausting section wherein vapors from the exhausting section are passed to the dehydrating section, alcohol containing liquid is removed from the base of the dehydrating section divided into two portions one of which is returned to the reactor and the other portion to the exhaust section, recovering the ether or ester as product from the bottom of the exhaust section and recovering a heterogenous azeotrope containing water and alcohol overhead. In some instances an auxiliary entrainer is used to remove water overhead in the dehydration section.

---

This invention relates to a process for making alcohol derivatives, and more specifically, it relates to a continuous process for making alcohol derivatives having a boiling point higher than that of the alcohol from which they are derived.

The principal object of this invention is to provide a simple efficient process for producing alcohol derivatives such as ethers and esters in a pure form with a minimum of energy consumption and equipment and a minimum loss of reactants, said ethers having a boiling point higher than that of the alcohol, and said esters having a boiling point higher than that of the alcohol and the acid from which they are derived.

When such alcohol derivatives, and especially ethers and esters distilling off above about 130° C. and preferably between 130 and 270° C. at atmospheric pressure, are produced according to conventional processes, the resulting heterogeneous azeotropic mixture of alcohol derivative and water becomes richer in water as the boiling point of the alcohol derivative becomes higher. In other words, as the boiling point of the alcohol derivative rises, the azeotropic mixture contains more and more water which is so removed from the mixture. As the boiling point rises, the necessarily higher reflux ratio of water required necesitates the use of more heat for repeated vaporization of the water, and the greater amount of heat results in a costly operation for alcohol derivatives such as ethers and esters having very high boiling points. This may also entail the use of larger, more costly equipment. Moreover, certain esters such as methoxyethyl acetate do not form a heterogeneous aqueous azeotrope, but rather they form a homogeneous azeotrope. In order to separate the ester from such a homogeneous azeotrope it is necessary to add an auxiliary substance to separate the ester from the water. This auxiliary substance complicates the process because it is withdrawn from the top of the column and from the decanter together with the ester and should thereafter be separated from the ester by distillation.

The process of this invention affords a less complicated, less expensive and less heat-consuming method of separating the ester or ether from the unreacted alcohol and the water which is formed in the process.

The invention accordingly comprises the novel processes and steps of processes, specific embodiments of which are described hereinafter by way of example and in accordance with which it is presently preferred to practice the invention.

Briefly, the alcohol derivatives (esters or ethers) are continuously separated from the other constituents of the reaction mixture in which they have been formed by means of a two-section distillation process. The first section is called an "exhaust section" and separates or exhausts the alcohol derivative from the other constituents of the reaction mixture, and the second section, called the "dehydration section," functions to separate the water from the unreacted alcohol.

The reaction mixture containing alcohol, alcohol derivative, and water is continuously fed to the distillation column at a point intermediate the two sections. The overhead vapors from the top of the exhaust section are fed to the base of the dehydration section and at least part of the liquid containing alcohol from the base of the dehydration section is fed back to the reaction zone. The top of the exhaust section is fed with liquid whose composition substantially corresponds to that of the bottoms of the dehydration section, said liquid being, for that purpose, taken from a zone of the apparatus containing liquid of substantially the said composition. The bottoms drawn from the exhaust section are essentially pure alcohol derivative. The water is removed, by hetero-azeotropic distillation, from the top of the dehydration section, the nonaqueous layer from the decantation of the hetero-azeotrope being recycled to the top of the dehydration section. The alcohol is withdrawn from the bottom of the dehydration section and is sent back to the reaction zone.

The process of this invention makes it possible to obtain substantially pure water from the top of the dehydration section, such water being essentially completely free of the reactants and reaction products, while at the same time pure ether or ester containing essentially no alcohol, acid, or water is obtained from the bottom of the exhaust section.

The overhead vapors removed from the dehydration section are condensed to form a heterogeneous azeotropic mixture. The water is then removed from the alcohol-containing azeotrope, preferably by decantation. Such decantation readily accomplishes a complete separation where the water solubility of the organic constituents is essentially nil. If small amounts of the alcohol remain in the water, they can conveniently be removed by a conventional auxiliary distillation step. If the solubility of the organic constituents of the mixture in water is too high for an aqueous heterogeneous mixture to be formed, an auxiliary liquid, preferably substantially insoluble in water, is introduced into the dehydration section to produce a heterogeneous azeotropic mixture necessary for removal of water without loss of products. Of course, such auxiliary liquid should be readily separable from the alcohol and the alcohol derivative. An example of such an auxiliary liquid is such a hydrocarbon. Generally liquid aliphatic and aromatic hydrocarbons containing from about 6 to about 12 carbon atoms are preferred.

When the process of this invention is used to produce the ester derivative of the feed alcohol, the reaction mixture frequently contains unreacted acid as well as unreacted alcohol. In such event the feed to the distillation column will contain the unreacted acid and alcohol, the alcohol derivative, and water, and the liquid withdrawn at the bottom of the dehydration section will contain alcohol and acid, which are simultaneously concentrated in this region of the column, from which region a portion is withdrawn and returned to the reaction zone to complete the conversion.

The esters which can be produced in accordance with the process of this invention can be derivatives of aliphatic carboxylic acids such as those containing from about 2 to 6 carbon atoms, e.g., acetic, propionic, butanoic, pentanoic acids and the like with (1) aliphatic alcohols such as those containing up to about 8 carbon atoms, more particularly butyl, amyl and octyl alcohols and their isomers and the like, (2) cyclic alcohols such as benzyl, cyclohexyl, cyclopentyl alcohols and the like, or (3) alkoxy alcohols, such as ethoxyethanol, methoxyethanol, and the like; or else from the combination of such alcohols with inorganic acids such as hydrochloric acid and the like. The ester produced according to the process of this invention is obtained in pure form and free from residual traces of esterification catalyst.

The pressure maintained at the top of the column varies according to the boiling point of the ester or ether formed at the ambient pressure in the column, the ease of condensing the azeotrope vapors, and the heat content of the vapors. Customarily, this pressure varies between about 40 and about 760 mm. Hg.

With this process the reaction can be completely performed in a unit comprising a reactor and a distillation column, and the only effluent obtained are essentially stoichiometric proportions of water and the alcohol derivatives formed by the reaction.

It will be understood that a single distillation column divided into two separate sections, the exhaust section and dehydration section, can be used in carrying out the process of this invention. Alternatively, for example two distinct distillation columns can be used, one column constituting the exhaust section and one column constituting the dehydration section. Such a plurality of column is considered equivalent herein for a single column divided into two sections. The two sections of the apparatus used in practicing the process of this invention preferably comprise a single distillation column with the dehydration section superposed on the exhaust section.

It will be understood that as used herein the introduction of reaction mixture intermediate the two sections includes the introduction of said mixture into the bottom or base of the dehydration section, the top of the exhaust section, or both simultaneously. Further, it will be understood that introduction of a liquid or vapor into the bottom of a section is taken to mean at or near the bottom and the introduction of a liquid into the top of a section is taken to mean at or near the top of such section. The composition of the liquid fed to the top of the exhaust section is substantially the same as that in the bottom of the dehydration section.

The physical apparatus used in carrying out the process of this invention can and preferably does include a reactor wherein the alcohol and any other reagents are reacted in the presence of a catalyst. A portion of the liquid withdrawn from the bottom of the dehydration section is fed back into the reactor together with fresh feed alcohol. Where the alcohol derivative to be produced is an ester, fresh acid is also fed to the reactor and the liquid withdrawn from the bottom of the dehydration section also generally contains acid in addition to alcohol. The fresh alcohol (and acid, if an esterification is involved) can either be admixed with the liquid withdrawn from the bottom of the dehydration section prior to introduction into the reactor or the alcohol (and acid) can be introduced simultaneously into the reactor with said liquid. Only enough reactants need to be combined with the liquid from the bottom of the dehydration section to replace the reactants consumed in production of the derivative.

The process of this invention can be readily understood in connection with the accompanying drawing in which:

FIGURE 1 is a schematic drawing of an embodiment of an apparatus which may be used in carrying out this invention, and FIGURE 2 is a partial schematic of another embodiment wherein a liquid nonvolatile catalyst is utilized in the reactor.

In the process carried out in the apparatus depicted in FIGURE 1, the esterification or etherification to form the alcohol derivative is carried out in reactor 11 which is in this case filled with a solid catalyst insoluble in the reaction mixture. A preferred solid insoluble catalyst is an ion exchange resin. The feed alcohol is introduced into the system at any point of the circuit consisting of reactor 11, pipe 17, the lower portion of dehydration section 22 of distillation column 10, a pipe 21, pump 14, and pipe 15. For example, the alcohol may be fed into pipe 12 located just upstream of pump 14.

If the feed alcohol contains water, it is preferred to feed it into section 22 of distillation column 10 by means of pipes 12' so that the alcohol is dehydrated therein without special expenditure of heat.

In the event that the alcohol derivative is formed by an esterification reaction so that it is necessary to have an acid fed to the reactor, the acid may be introduced into the circuit through pipe 13 upstream of pump 14 or if it contains water it may be introduced alone or together with the alcohol through pipe 12'. Concentrated dehydrated alcohol and any additional acidic reactant, if present, are withdrawn from the column through pipe 21. The reactants or reactant mixture are conducted into reactor 11 by means of pump 14. If desired, the reactants or reactant mixture may be adjusted to the desired temperature by means of optional heat exchanger 16.

The reaction mixture effluent, generally in liquid form, is conducted by means of pipe 17 and pipe 19 through valves 18 and 20 to the base of dehydration section 22b and to the head of exhaust section 23.

It will be appreciated from this description that the reaction mixture fed to the distillation column can be introduced into the top of the exhaust section, the bottom of dehydration section, or into both the top of the exhaust section and the bottom of the dehydration section simultaneously, and that for the purposes of this invention the aforesaid modes of introducing feed to the column are considered to be in an area intermediate to the bottom of the dehydration section and the top of the exhaust section.

The heating coil 24 at the base of exhaust section 23 supplies heat to column 10. The vapors from the top of exhaust section 23 are passed through pipe 26 into the base of dehydration section 22, these vapors comprising unreacted alcohol and in the case of an esterification reaction also any unreacted acid. The water fed to the distillation column 10, including firstly any water formed in the reaction and secondly the water introduced with any of the reactants, is separated at the top of dehydration section 22, and is generally entrained in the form of a heterogeneous azeotropic mixture.

The vapors withdrawn from the top of section 22 through pipe 27 are liquefied in condenser 28, and the condensate flows through pipe 29 into decanter 30. The water layer is withdrawn from decanter 30 through pipe 31, and it will be understood that if this layer contains small amounts of dissolved alcohol it is possible to recover such alcohol by distilling the aqueous material in a conventional distillation column. For the sake of simplicity, such a column is not shown in the embodiment illustrated in FIGURE 1. The organic layer is withdrawn from decanter 30 by means of pipe 32 and refluxed into the upper portion of dehydration section 22.

Alternatively, the process can be carried out with the decanter placed inside the head part of dehydration section 22. The decanter 30' in this alternative arrangement is disposed in the upper portion of the column and the water layer is removed by means of pipe 31'. When this mode of operation is employed the organic layer can be allowed to flow directly back down into dehydration section 22. It will be appreciated by those skilled in the art that both decanters 30 and 30' can be used, and that in this case the bulk of the water is removed through pipe 31' and a portion of the upper layer of decanter 30 is removed by means of pipe 33. This enables the removal of any small amounts of low-boiling impurities which might have formed during the reaction or which may have been present in the reactants fed to the system.

Exhaust section 23 is used to deplete the alcohol derivative from the still feed. The pure alcohol derivative, ether or ester, is withdrawn at the bottom of exhaust section 23 by means of pipe 25.

The apparatus of FIGURE 2 can be used where the catalyst is a liquid non-volatile material, for example a mineral acid such as sulfuric acid or phosphoric acid. Since the differences in this mode of operation relate chiefly to the reactor circuit and the feed means for distillation column 10, only this portion of the apparatus is schematically shown in FIGURE 2, it being understood that the remainder of the apparatus can be as illustrated in and described with respect to FIGURE 1.

In FIGURE 2 the reactor 111 is a vessel maintained at the boiling temperature of the reaction mixture by means of heating coil 116. The effluent reaction product from reactor 111 is introduced as vapors by pipe 117 into the base of dehydration section 22 of distillation tower 10. The top of exhaust section 23 is fed with liquid from the base of dehydration section 22 by means of pipe 119 connected with pipe 121, the rate of feed being controlled by valve 120. The remainder of the liquid withdrawn from the bottom of section 22 is sent back to reactor 111 through pipe 121, pump 114, and pipe 115.

Where it is desired to produce an ether having a boiling point above that of starting alcohol such as for example dibutyl ether the operation is preferably carried out in an apparatus such as that shown in FIGURE 1, by passing the reactants over and through a solid catalyst, as for example an ion exchange resin, maintained in a reactor of conical shape such as that described in U.S. Patent No. 2,980,731. In this case the reaction mixture passing over the catalyst contains from about 0.5 to about 2% by weight of water and from about 20 to about 60% by weight of the ether obtained from the alcohol, the remainder of the reaction mixture being alcohol.

All percentages given herein are by weight, unless otherwise specified.

For the production of ether by this process, the contact time should generally preferably be kept below about 2 hours. As used herein "contact time" is the ratio of the volume of catalyst to the volume of reactants fed over a one-hour period and measured at 20° C. The volume of catalyst is, for sake of commodity, measured lying under water. For the etherification reaction the temperature is preferably maintained in the range of 120–160° and the conversion rate of butanol to dibutyl ether under such conditions is generally found to vary from about 5 to about 40%.

Although ether is a reaction product, it is advantageous to have relatively high amounts of ether present in the reactor feed mixture so that the effluent from the reactor has a ratio of ether/(alcohol+ether) corresponding to the composition of the binary azeotropic mixture. Under such conditions the ether can be separated by merely removing the reaction products from the ether in a distillation column.

In this mode of operation, the heat introduced into exhaust section 23 also supplies the necessary heat for the operation of dehydration section 22. The heat is utilized to feed to section 22 back from section 23 the unconverted alcohol together with the desired proportion of ether (the proportion being controlled by regulating the reflux ratio in the column) and to form a heterogeneous, ternary azeotropic mixture of water, alcohol, and ether necessary to effect the removal of all the water. The water effluent may contain small amounts of alcohol, 2–3% in the case where butanol is reacted to produce dibutyl ether, which may be treated by conventional distillation to recover the alcohol.

Because of recycle to the reactor through pipe 21 of alcohol in admixture with a large proportion of ether, the concentration of ether in the liquid fed to the reactor can be maintained at as high a level as desired within the limits set by the reaction velocity. The reaction velocity is usually maintained at a value such that between 50 and 200 grams of ether per hour per liter of catalyst are obtained. In actual practice the ether concentration in the feed will be approximately 50% by weight, though it will be appreciated that other concentrations can be utilized.

The invention will be illustrated further by reference to the following examples.

EXAMPLE I

In connection with this illustration of an embodiment of the invention wherein dibutyl ether is produced, the apparatus as represented in FIGURE 1 is used. Reactor 11 is fed through pipe 12 with 225 kg./hr. butanol and 2,275 kg./hr. of reflux liquid from dehydration section 22 recirculated through pipe 21. The reactor is charged with 1,650 liters of polystyrene sulfonic type ion exchange resin. The stream leaving reactor 11 through pipe 17 is found to have a composition of:

| | Percent |
|---|---|
| Butanol | 45.1 |
| Dibutyl ether | 53.0 |
| Water | 1.9 |

This reaction mixture in the amount of 1,650 kg./hr. is fed to the upper plate of exhaust section 23, and the remainder of the reaction mixture is introduced by means of pipe 18 into dehydration section 22. In the exhaust, 196 kg./hr. of dibutyl ether is separated from the mixture and withdrawn as bottoms through pipe 25. From the top of the column and decanter 30' is withdrawn via pipe 31' about 47 kg./hr. of water containing less than 1 kg./hr. of butanol with some traces of dibutyl ether. The low boiling impurities are removed through pipe 33, the maximum amount of butanol so withdrawn contaminated with unsaturated hydrocarbons and traces of aldehydic impurities being only about 2 kg./hr. The purity of the dibutyl ether produced is such that no futher purification or additional purifying equipment is required.

The heat expense amounts to about 1 kg. of steam per kg. of dibutyl ether. By conventional processes, the heat expense amounts to about 2.5 kg. steam.

EXAMPLE II

Ethoxyethyl acetate is produced by feeding 135 kg./hr. ethoxyethyl alcohol and 90 kg./hr. acetic acid into reactor 11 which is of the cone-shaped type described in U.S. Patent No. 2,980,731. The reactor has previously been charged with 2,000 liters of polystyrene sulfonic type ion exchange resin, said catalyst being maintained in suspension by a 7,000 liters/hr. flow rate through the reactor. The flow rate is controlled by valve 18. The reaction mixture is maintained at a temperature of 135° C. and its composition as determined by analyzing samples withdrawn from pipe 17 is found to be:

| | Percent |
|---|---|
| Ethoxyethyl acetate | 50.0 |
| Ethoxyethanol | 36.7 |
| Acetic acid | 12.0 |
| Water | 1.3 |

About 2,200 kg./hr. of this reaction mixture is fed to exhaust section 23 via pipe 19, and the remainder is fed via pipe 18 to dehydration section 22. The top portion of section 22 is charged with 190 kg. of benzene to form an auxiliary heterogeneous azeotropic mixture. About 198 kg./hr. of ethoxyethyl acetate is withdrawn through pipe 25 and about 24 kg./hr. of water is withdrawn via pipe 31. The loss of ethoxyethyl acetate at the upper portion of the column is less than 0.2% of the production and the loss of ethoxyethanol is less than about 0.3% of the feed alcohol.

The heat expense amounts to about 3 kg. of steam per kg. of ethoxyethyl acetate. By conventional processes, the heat expense amounts to about 8 kg. of steam.

EXAMPLE III

Under the same operating conditions as set forth above for Example II, ethoxyethyl acetate is produced by feeding pipe 12 with 130 kg./hr. of ethoxyethanol, 2 kg./hr. of ethanol, and 1 kg/hr. of butanol, and 90 kg./hr. acetic acid is fed to the apparatus via pipe 13. The composition of reaction mixture does not substantially differ from that given above in Example II, but the 24 kg./hr. of water withdrawn from the process contains 1.2 kg./hr. of ethyl acetate and 0.2 kg./hr. of butyl acetate. Through pipe 33 is removed 2 kg./hr. ethyl acetate and about 1.4 kg./hr. butyl acetate These two low boiling esters are employed in the head portion of dehydration section 22 as the auxiliary liquid giving rise to an auxiliary heterogeneous azeotropic mixture.

The losses of ethoxyethyl acetate and ethoxyethanol in the upper portion of the distillation column are below 0.3% each.

The heat expense is substantially the same as in Example II.

EXAMPLE IV

Octyl acetate is produced in the apparatus modified as represented in FIGURE 2 by feeding 130 kg./hr. of octanol via pipe 112 and 60 kg./hr. acetic acid via pipe 113.

The reaction vessel 111 contains 1,000 l. of reaction mixture maintained at its boiling temperature with the pressure of 50 mm./Hg being maintained at the top of distillation column 10. The composition of the reaction mixture in reactor 111 is:

|                | Percent |
|----------------|---------|
| Octyl acetate  | 45      |
| Octanol        | 35      |
| Water          | 0.5     |
| Acetic acid    | 19      |
| Sulfuric acid  | 0.5     |

The vapors evolved in the reaction vassel are introduced into dehydration section 22 via pipe 117. At the upper part of the distillation column the immiscible azeotropic water-octanol mixture permits the removal of 18 kg./hr. of water. From the base of the column 172 kg./hr. of octyl acetate is withdrawn. The reflux ratio in the column, expressed as a molar ratio, is 15 and the liquid throughput in pipe 121 amounts to 5,000 kg./hr.

The heat expense amounts to less than 4 kg. of steam per kg. of octyl acetate. By conventional processes, the heat expense amounts to about 7–8 kg. of steam.

I claim:
1. A process for the preparation of alcohol derivatives containing up to sixteen carbon atoms which are esters or ethers boiling at atmospheric pressure at a temperature which is above 130° C. and above the boiling point of the starting alcohol or acid from which the derivative is prepared which comprises the steps of continuously:
 (1) forming in a reactor a reaction mixture containing water, the alcohol derivative and the starting alcohol,
 (2) introducing effluent from said reaction mixture into a distillation column, having a dehydration section and an exhaust section, into a zone of the distillation column encompassing the bottom of the dehydration section and the top of the exhaust section,
 (3) withdrawing vapors from the top of the exhaust section and introducing them into the bottom of the dehydration section,
 (4) withdrawing liquid containing alcohol from the base of the dehydration section and introducing at least a portion of said liquid into said reaction mixture,
 (5) withdrawing liquid from a zone containing liquid of substantially the same composition as the liquid in the bottom of the dehydration section and introducing said withdrawn liquid into the top of the exhaust section,
 (6) withdrawing said alcohol derivative from the base of the exhaust section,
 (7) forming, condensing and decanting a heterogeneous azeotropic mixture containing water and alcohol, and
 (8) separating the water from the decanted mixture and refluxing at least a part of the remainder of said mixture into the top of the dehydration section.

2. A process for the preparation of alcohol derivatives containing up to sixteen carbon atoms which are esters or ethers boiling at atmospheric pressure at a temperature which is above 130° C. and above the boiling point of the starting alcohol or acid from which the derivative is prepared which comprises the steps of continuously:
 (1) forming in a reactor a reaction mixture containing water, the alcohol derivative and the starting alcohol,
 (2) introducing effluent from said reaction mixture into a distillation column, having a dehydration section and an exhaust section, into a zone of the distillation column encompassing the bottom of the dehydration section and the top of the exhaust section,
 (3) withdrawing vapors from the top of the exhaust section and introducing them into the bottom of the dehydration section,
 (4) withdrawing liquid containing alcohol from the base of the dehydration section, dividing said liquid into two portions, introducing the first portion of the liquid into said reactor and introducing the second portion of said liquid into the top of the exhaust section,
 (5) withdrawing liquid from a zone containing liquid of substantially the same composition as the liquid in the bottom of the dehydration section and introducing said withdrawn liquid into the top of the exhaust section,
 (6) withdrawing said alcohol derivative from the base of the exhaust section,
 (7) forming, condensing and decanting a heterogeneous azeotropic mixture containing water and alcohol, and
 (8) separating the water from the decanted mixture and refluxing at least a part of the remainder of said mixture into the top of the dehydration section.

3. A process for the preparation of alcohol derivatives containing up to sixteen carbon atoms which are esters or ethers boiling at atmospheric pressure at a temperature which is above 130° C. and above the boiling point of the starting alcohol or acid from which the derivative is prepared which comprises the steps of continuously:
 (1) forming in a reactor a reaction mixture containing water, the alcohol derivative and the starting alcohol,
 (2) introducing effluent from said reaction mixture into a distillation column, having a dehydration section and an exhaust section, into a zone of the distillation column encompassing the bottom of the dehydration section and the top of the exhaust section,
 (3) withdrawing vapors from the top of the exhaust section and introducing them into the bottom of the dehydration section,
 (4) withdrawing liquid containing alcohol from the base of the dehydration section and introducing at least a portion of said liquid into said reaction mixture,
 (5) withdrawing liquid from a zone containing liquid of substantially the same composition as the liquid in the bottom of the dehydration section and introducing said withdrawn liquid into the top of the exhaust section, (6) withdrawing said alcohol derivative from the base of the exhaust section, (7) introducing an auxiliary liquid into the top of the dehydration section to form a heterogeneous azeotropic mixture containing water, alcohol and auxiliary liquid, condensing and decanting said azeotropic mixture, and (8) separating the water from the decanted mixture and refluxing at least a part of the remainder of said mixture into the top of the dehydration section.

4. The process of claim 3 wherein the auxiliary liquid is essentialy insoluble in water.

5. The process of claim 4 wherein the auxiliary liquid is a hydrocarbon.

6. A process for the preparation of alcohol derivatives containing up to sixteen carbon atoms which are esters boiling at atmospheric pressure at a temperature which is above 130° C. and above the boiling point of the starting alcohol or acid from which the derivative is prepared which comprises the steps of continuously:

(1) forming in a reactor a reaction mixture containing water, the alcohol derivative, the selected acid and the starting alcohol, (2) introducing effluent from said reaction mixture into a distillation column, having a dehydration section and an exhaust section, into a zone of the distillation column encompassing the bottom of the dehydration section and the top of the exhaust section, (3) withdrawing vapors from the top of the exhaust section and introducing them into the bottom of the dehydration section, (4) withdrawing liquid containing alcohol from the base of the dehydration section and introducing at least a portion of said liquid into said reaction mixture, (5) withdrawing liquid from a zone containing liquid of substantially the same composition as the liquid in the bottom of the dehydration section and introducing said withdrawn liquid into the top of the exhaust section, (6) withdrawing said alcohol derivative from the base of the exhaust section, (7) forming, condensing and decanting a heterogeneous azeotropic mixture containing water and alcohol, and (8) separating the water from the decanted mixture and refluxing at least a part of the remainder of said mixture into the top of the dehydration section.

7. A process for the preparation of alcohol derivatives containing up to sixteen carbon atoms which are ethers boiling at atmospheric pressure at a temperature which is above 130° C. and above the boiling point of the starting alcohol or acid from which the derivative is prepared which comprises the steps of continuously:

(1) forming in a reactor a reaction mixture containing water, the alcohol derivative and the starting alcohol, (2) introducing effluent from said reaction mixture into a distillation column, having a dehydration section and an exhaust section, into a zone of the distillation column encompassing the bottom of the dehydration section and the top of the exhaust section, (3) withdrawing vapors from the top of the exhaust section and introducing them into the bottom of the dehydration section, (4) withdrawing liquid containing alcohol from the base of the dehydration section and introducing at least a portion of said liquid into said reaction mixture, (5) withdrawing liquid from a zone containing liquid of substantially the same composition as the liquid in the bottom of the dehydration section and introducing said withdrawn liquid into the top of the exhaust section, (6) withdrawing said alcohol derivative from the base of the exhaust section, (7) forming, condensing and decanting a heterogeneous azeotropic mixture containing water and alcohol, and (8) separating the water from the decanted mixture and refluxing at least a part of the remainder of said mixture into the top of the dehydration section.

8. A process for the preparation of alcohol derivatives containing up to sixteen carbon atoms which are esters or ethers boiling at atmospheric pressure at a temperature which is above 130° C. and above the boiling point of the starting alcohol or acid from which the derivative is prepared which comprises the steps of continuously:

(1) forming in a reactor a reaction mixture containing water, the alcohol derivative and the starting alcohol, (2) introducing effluent from said reaction mixture into a distillation column, having a dehydration section and an exhaust section, into a zone of the distillation column encompassing the bottom of the dehydration section and the top of the exhaust section, (3) withdrawing vapors from the top of the exhaust section and introducing them into the bottom of the dehydration section, (4) withdrawing liquid containing alcohol from the base of the dehydration section and introducing at least a portion of said liquid into said reaction mixture, (5) withdrawing liquid from a zone containing liquid of substantially the same composition as the liquid in the bottom of the dehydration section and introducing said withdrawn liquid into the top of the exhaust section, (6) withdrawing said alcohol derivative from the base of the exhaust section, (7) forming, condensing and decanting a heterogeneous azeotropic mixture containing water and alcohol, and (8) separating the water from the decanted mixture and refluxing at least a part of the remainder of said mixture into the top of the dehydration section.

9. A process as in claim 6 wherein at least one substance selected from the group of acids having a boiling point below the boiling point of said selected acid and alcohols having a boiling point of said starting alcohol is introduced into the reactor to form a low boiling ester which has a boiling point below that of the said alcohol derivative and forms a heterogeneous azeotropic mixture containing water and starting alcohol.

References Cited

UNITED STATES PATENTS

| | | | |
|---|---|---|---|
| 1,536,544 | 5/1925 | Willkie | 260—616 |
| 1,988,801 | 1/1935 | Lebo et al. | 260—499 |
| 2,311,180 | 2/1943 | Bogart et al. | 203—75 |
| 2,407,920 | 9/1946 | Cox | 203—38 |
| 2,485,329 | 10/1949 | Steele et al. | 260—616 |
| 2,759,967 | 8/1956 | Cash et al. | 260—488 |
| 2,787,636 | 4/1957 | Alheritiere et al. | 260—499 |
| 2,805,262 | 9/1957 | Delaune et al. | 260—616 |
| 2,862,962 | 12/1958 | Ulvild et al. | 260—499 |
| 2,865,955 | 12/1958 | Ascherl et al. | 260—499 |

WILBUR L. BASCOMB, JR., *Primary Examiner.*